Feb. 18, 1964　　　D. DE PERCZEL　　　3,121,376
NEEDLE-MATCHING EXPOSURE CONTROL
Filed Aug. 4, 1961　　　　　　　　　　　　3 Sheets-Sheet 1

Inventor:
Desi dePerczel
By Robert H. Michler Atty.

Feb. 18, 1964  D. DE PERCZEL  3,121,376
NEEDLE-MATCHING EXPOSURE CONTROL
Filed Aug. 4, 1961  3 Sheets-Sheet 3

Inventor:
Desi dePerczel
By Robert F. Michel, Atty.

3,121,376
NEEDLE-MATCHING EXPOSURE CONTROL
Desi de Perczel, Chicago, Ill., assignor to Bell & Howell
Company, Chicago, Ill., a corporation of Illinois
Filed Aug. 4, 1961, Ser. No. 129,273
3 Claims. (Cl. 95—10)

This invention relates to a needle-matching exposure control, and more particularly to an exposure control attachment for a motion picture camera.

An object of the invention is to provide a new and improved needle-matching exposure control.

Another object of the invention is to provide an attachment including a light meter adapted to be connected to a manual diaphragm setting member.

A further object of the invention is to provide for a camera a rotative knob carrying a light meter adapted when moved to a position in which the needle of the meter is aligned with a mark on the camera to set an exposure control device in the camera in accordance with the level of illumination of the light meter.

A complete understanding of the invention may be obtained from the following detailed description of an exposure control forming a specific embodiment thereof, when read in conjunction with the appended drawings, in which.

Figure 1:
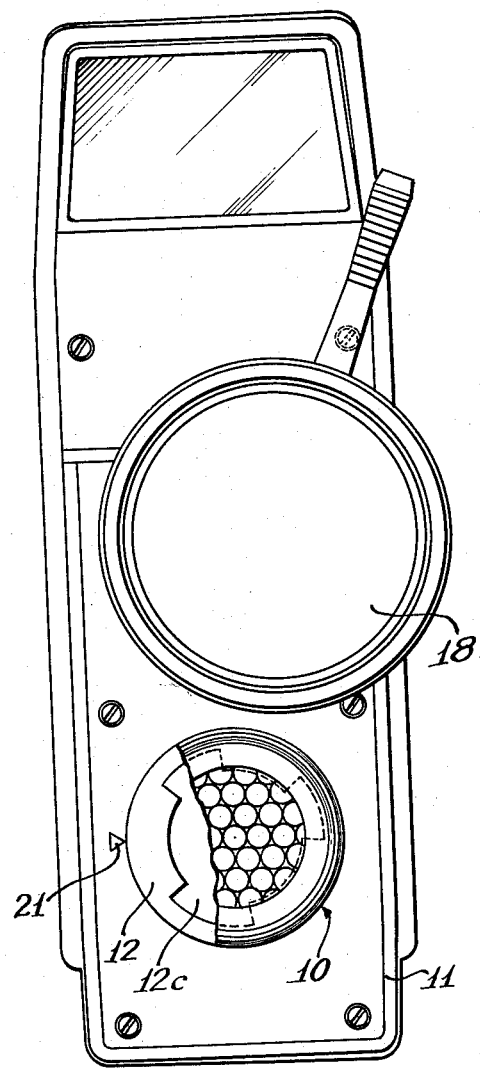
FIG. 1 is a front elevation view of a camera having an exposure control forming one embodiment of the invention.
Figure 4:
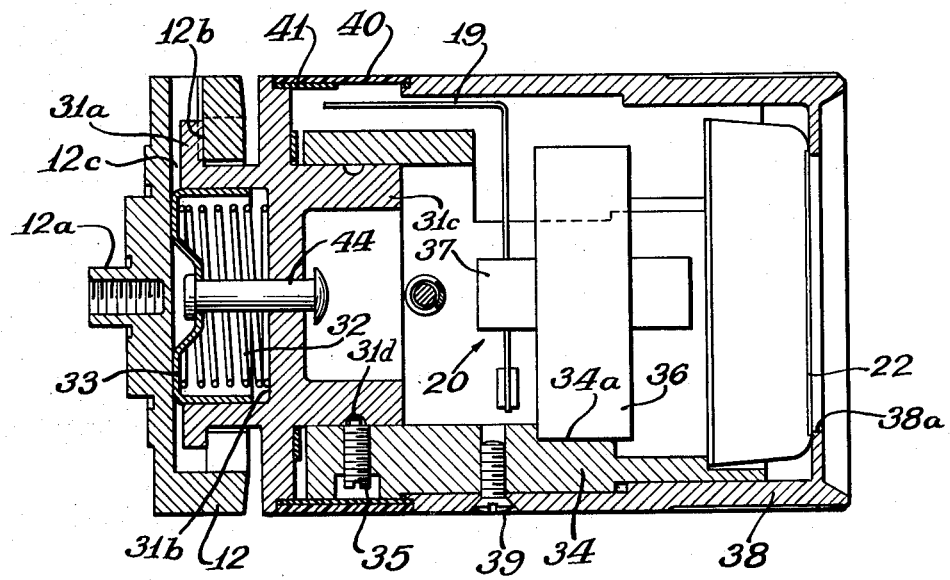
Figure 5:
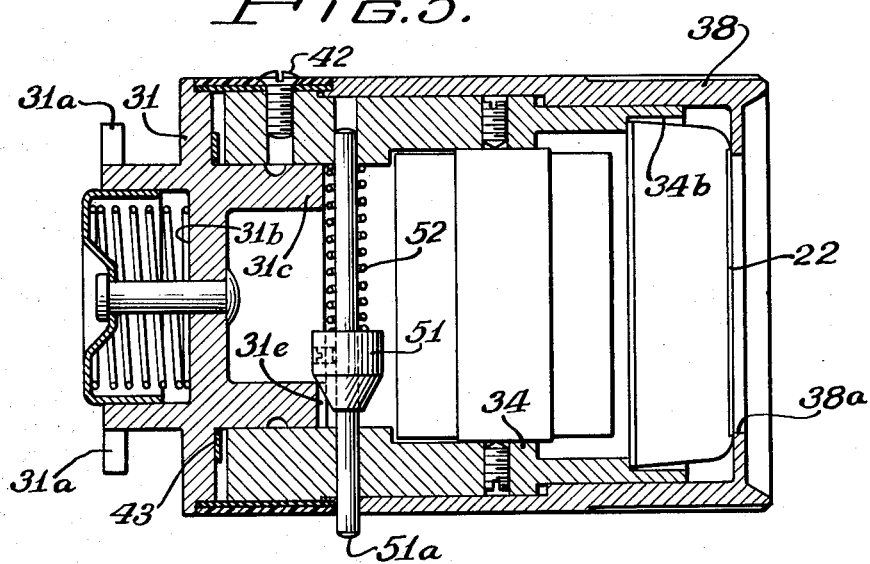

FIGS. 4 and 5 are sectional views of a light meter attachment of the exposure control of FIG. 1; and FIGS. 6 and 7 are elevation views of the attachment of FIGS. 4 and 5.

The invention provides a needle-matching exposure control in which a light meter is mounted in a manually rotatable knob for setting a shutter or diaphragm. Preferably the rotatable knob is in the form of an attachment which may be substituted for the diaphragm control knob of a camera.

Referring now in detail to the drawings, there is shown therein a needle-matching control knob or attachment 10 which replaces the manually actuated diaphragm control knob (not shown) of a known motion picture camera 11. The knob 10 attaches and is keyed to a disc 12 in an oriented position relative thereto, and the disc 12 is keyed to a cam 13 designed to drive a spring-pressed cam follower link 14 to turn gear 15 which drives known externally toothed or geared diaphragm blades 16 and 17 in the light path from camera lens 18. When the knob 10 is turned until a needle 19 (FIGS. 4 and 6) of a light meter 20 is aligned with a stationary mark 21 (FIG. 1) on the camera, the cam 13 sets the diaphragm blades 16 and 17 to provide the proper size aperture for the level of light on photocell 22 of the light meter to give precise exposure when the camera is operated to expose film. The disc 12 is fastened rigidly to the cam 13 by means of screw 23 threaded into keying boss 12a.

The needle-matching attachment or knob 10 includes breech-type fastening member or adapter 31 having asymmetrical teeth 31a pressed into complementary inwardly facing keying recesses 12b by spring 32 seated in recess 31b (FIG. 4) and pressing against cup 33 fixed to sliding guide rod 44, clearance space 12c being provided to permit insertion and location of the teeth 31a in the disc 12. A cylinder or sleeve 34 is secured rotatably on boss 31c by screw 35 projecting into annular groove 31d and fixed to sleeve 34. Known galvanometer stator or magnet 36 is mounted in a fixed position in counterbore 34a, the galvanometer also carrying known coil 37 and the needle 19 fixed to the coil. The photocell 22 is connected by known leads (not shown) to the coil and drives the coil in accordance with light falling on the cell which is fixed in counterbore 34b in a position facing in the same general direction as the lens 18 of the camera, an opening 38a in knurled covering sleeve 38 defining the acceptance angle of the photocell and secured to sleeve 34 by screw 39. A transparent ring 40 and a scale 41 are fixed by screw 42 to the sleeve 34 to rotate therewith. Spring washer 43 urges the sleeve 34 to the right as viewed in FIG. 5 which movement is limited by the screw 35.

Figure 2:
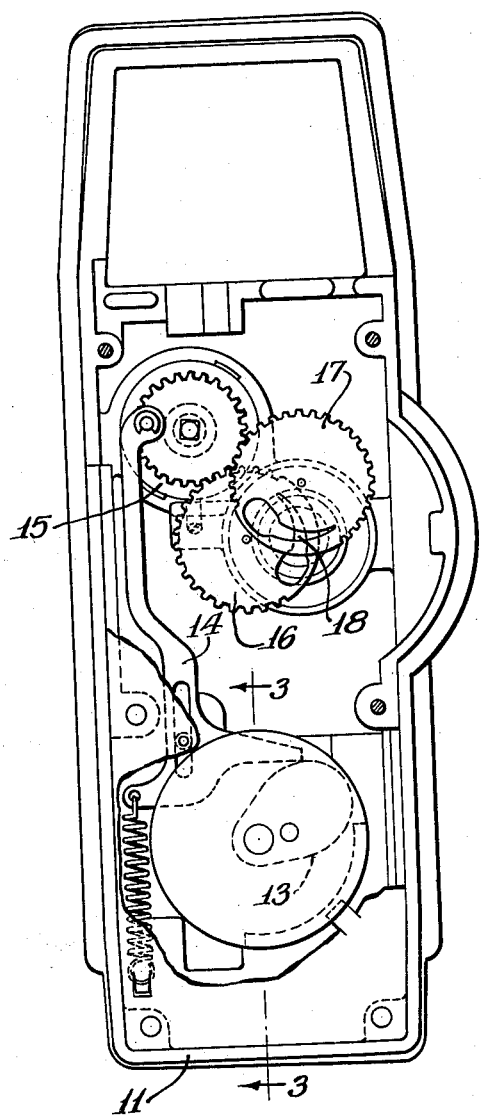
FIG. 2 is a view similar to FIG. 1 with portions of the camera housing broken away.
Figure 3:
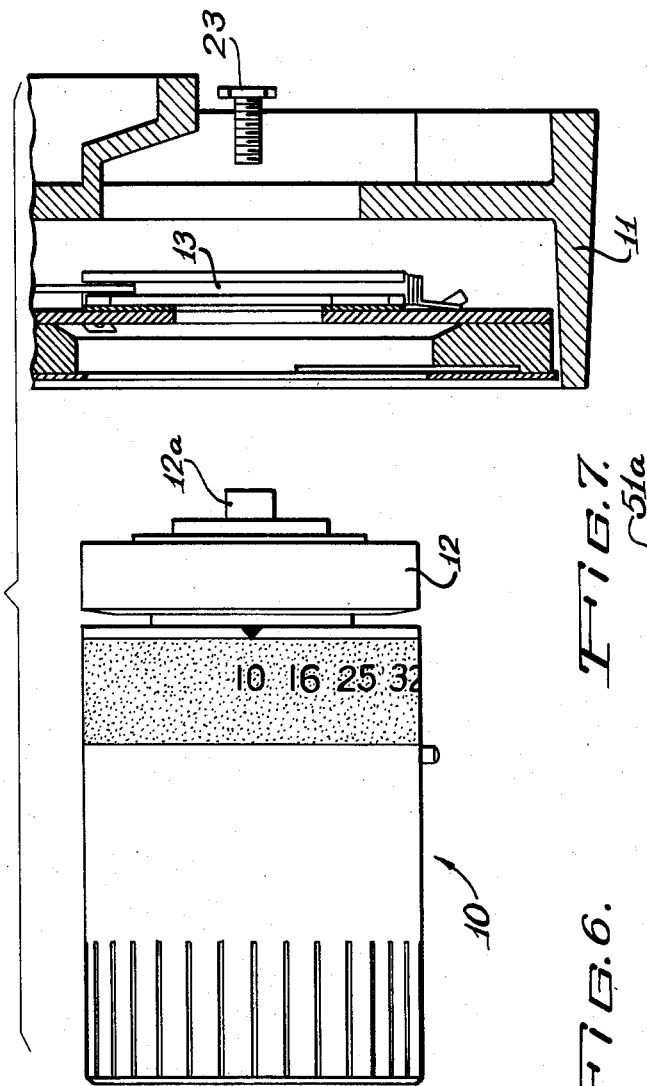
FIG. 3 is an exploded, fragmentary, vertical sectional view taken along line 3—3 of FIG. 2 with the light meter attachment shown in elevation.

For calibrating the meter 20 with the ASA rating of the film being used in the camera, the sleeve 34 with the meter 20 is locked in a selected rotative position relative to the adapter 31 by a spring-pressed locking detent 51 (FIG. 5), which engages a selected one of notches 31e. This adjustment may be effected by pushing end 51a to push the detent 51 against the action of spring 52 and turning the sleeve 38 relative to adapter 31 until the desired number of ASA scale 53 (FIG. 7) is adjacent pointer 31f, this serving to selectively change the position of the meter 36 relative to the diaphragm adjusting cam 13 (FIG. 2).

The scale 41 is provided with alternating dark and light areas 41a and 41b so shaped as to transpose or interpolate the position of the meter needle 19 to the mark 21, each of the areas 41a and 41b representing one f-stop. In setting the diaphragm, the control knob 10 is rotated until the pointer 21 is at the same position relative to the adjacent edge of the area 41a or 41b as the needle 19. That is, if the needle 19 is directed at the upper portion of one area 41a, the knob 10 is rotated until the mark 21 is adjacent the upper portion of the opposite edge of the same area 41a.

While the invention is thus described, it is not wished to be limited to the precise details described, as changes may be readily made without departing from the spirit of the invention.

What is claimed is:

1. In a camera including an adjustable diaphragm and an actuator rotatable on a predetermined axis for adjusting the diaphragm, the combination therewith of a rotatable light meter including a photocell and a galvanometer having a stator and a needle, means keying the light meter to the actuator in a position in which the photocell faces in substantially the same direction as said predetermined axis, fixed pointer means on the camera relative to which the needle may be aligned to set the diaphragm in proper adjustment, a scale divided into areas representing f-stops, locking means securing the meter fixedly relative to the actuator, and means mounting the scale in a position extending between the needle and the fixed pointer means so as to permit the needle to be accurately lined up with the fixed pointer.

2. The camera of claim 1 wherein the locking means is adjustable to shift the meter relative to the actuator to compensate for different film speeds.

3. In a camera having adjustable diaphragm means and actuator means for the diaphragm means including a disc having a breech-type keying portion, the combination therewith of an adapter having a breech-type keying portion adapted to interlock with the disc, spring-pressed means for locking the adapter to the disc, a mounting sleeve rotatable on the adapter, detent means for adjustably keying the sleeve to the adapter, a photocell mounted in one end of the sleeve, a galvanometer mounted in the sleeve and having a needle visible from the exterior, and a fixed pointer on the camera adjacent to the needle.

References Cited in the file of this patent

UNITED STATES PATENTS

| | | |
|---|---|---|
| 2,250,898 | Tonnies | July 29, 1941 |
| 2,937,568 | Rander | May 24, 1960 |
| 2,943,544 | Cronholm | July 5, 1960 |